United States Patent
Collins et al.

(10) Patent No.: US 7,074,258 B2
(45) Date of Patent: Jul. 11, 2006

(54) PROCESS FOR DEHYDRATING GAS

(75) Inventors: Ian Ralph Collins, Sunbury-on-Thames (GB); Stephen Paul Goodwin, London (GB)

(73) Assignee: BP Exploration Operating Company Limited, London (GB)

( * ) Notice: Subject to any disclaimer, the term of this patent is extended or adjusted under 35 U.S.C. 154(b) by 112 days.

(21) Appl. No.: 10/474,128

(22) PCT Filed: Mar. 6, 2002

(86) PCT No.: PCT/GB02/00999

§ 371 (c)(1),
(2), (4) Date: Mar. 17, 2004

(87) PCT Pub. No.: WO02/081062

PCT Pub. Date: Oct. 17, 2002

(65) Prior Publication Data

US 2004/0139855 A1    Jul. 22, 2004

(30) Foreign Application Priority Data

Apr. 4, 2001    (GB) ................. 0108386.4

(51) Int. Cl.
*B01D 53/28* (2006.01)
(52) U.S. Cl. .......................... 95/193; 95/231
(58) Field of Classification Search .............. 95/153, 95/178, 187, 188, 193, 209, 231; 585/833
See application file for complete search history.

(56) References Cited

U.S. PATENT DOCUMENTS

| | | | |
|---|---|---|---|
| 3,837,143 A | 9/1974 | Sutherland et al. | |
| 4,421,535 A | 12/1983 | Mehra | |
| 4,511,381 A | 4/1985 | Mehra | |
| 4,575,387 A | 3/1986 | Larue et al. | |
| 4,859,802 A | 8/1989 | Thomas et al. | |
| 5,071,454 A | 12/1991 | Streitberger et al. | |

(Continued)

FOREIGN PATENT DOCUMENTS

CA    1098688    4/1981

(Continued)

OTHER PUBLICATIONS

Epps, R., "Use of Selexol Solvent for Hydrocarbon Dewpoint Control and Dehydration of Natural Gas"; Accession No. 1995:523377, Caplus, Abstract.

(Continued)

*Primary Examiner*—Frank M. Lawrence
(74) *Attorney, Agent, or Firm*—Nixon & Vanderhye (57) ABSTRACT

A process for the removal of water from gas which comprises an absorption step of bringing a gas saturated with water vapor into gas-liquid contact with a water-lean absorbing liquid comprising a water absorbing liquid having a cloud point temperature above the freezing point of water whereby water vapor present in the gas is absorbed into the water-lean absorbing liquid at a temperature below its cloud point to produce a refined gas having a reduced water vapor content and water-loaded absorbing liquid. A regeneration step is provided in which the water-loaded absorbing liquid is heated to above the cloud point temperature of the absorbing liquid whereby the water-loaded absorbing liquid separates into a water-rich phase and an absorbing liquid-rich phase and the absorbing liquid-rich phase is cooled to a temperature below its cloud point prior to recycling the absorbing liquid-rich phase for use as water-lean absorbing liquid in the absorption step.

28 Claims, 2 Drawing Sheets

U.S. PATENT DOCUMENTS

| | | | |
|---|---|---|---|
| 5,725,636 A | 3/1998 | Gavlin et al. | |
| 5,725,637 A | 3/1998 | Gavlin et al. | |
| 5,854,358 A | 12/1998 | Heinemann et al. | |
| 5,922,109 A | 7/1999 | Rooney et al. | |
| 6,425,942 B1 | 7/2002 | Forster | |

FOREIGN PATENT DOCUMENTS

| | | | |
|---|---|---|---|
| EP | 0 193 327 A1 | 9/1986 | |
| EP | 0 211 659 A2 | 2/1987 | |
| EP | 0 406 768 A2 | 7/1989 | |
| GB | 2 075 544 A | 11/1981 | |
| RU | 581618 | 1/1976 | |
| RU | 2058805 C1 | 5/1992 | |
| RU | 2 091 435 C1 | 5/1995 | |
| SU | 1528548 A1 | 1/1988 | |
| SU | 1620119 A1 | 12/1988 | |
| WO | 0 444 760 A1 | 9/1991 | |
| WO | WO 94/11090 | 5/1994 | |
| WO | WO 98/59021 | 12/1998 | |

OTHER PUBLICATIONS

Smith, R.S.; "Custom Glycol Units Extend Operating Limits" Accession No. 1993:257732, Caplus, Abstract.

Pearce, R.L. et al; "Fundamentals of Gas Dehydration Design and Operation with Glycol Solutions"; Accession No. 1984:613600, Caplus, Abstract.

Environmental Protection Agency Risk Management Plan 10008 Texas, Executive Summary May 3, 1999; Fandango Treating Plant, Escobas, TX 78076 (3 pages).

IFP Industrial Division; "Ifpexol Simplifies Gas Processing"; pp. (1985), (9 pages).

PROCESS FOR DEHYDRATING GAS

This application is the U.S. national phase of international application PCT/GB02/00999, filed 6 Mar. 2002, which designated the U.S.

BACKGROUND OF THE INVENTION

This invention relates to a process for dehydrating gas, in particular, natural gas.

Conventional processes for the dehydration of natural gas involve absorption of water into a solvent, such as triethylene glycol. Regeneration of the solvent is achieved by distilling off the absorbed water which requires large amounts of energy. Also, an undesirable side effect of such processes is co-vaporization of aromatics (absorbed from the natural gas) with the water in the distillation step. It is therefore necessary to recover the aromatic compounds before discharging the water to the environment.

SUMMARY OF THE INVENTION

The present invention relates to a process for the removal of water from a gas which comprises:
(a) an absorption step of bringing a gas saturated with water vapour into gas-liquid contact with a water-lean absorbing liquid comprising a water absorbing liquid having a cloud point temperature above the freezing point of water whereby water vapour present in the gas is absorbed into the water-lean absorbing liquid at a temperature below its cloud point to produce a refined gas having a reduced water vapour content and water-loaded absorbing liquid; and
(b) a regeneration step of heating the water-loaded absorbing liquid to above the cloud point temperature of the absorbing liquid whereby the water-loaded absorbing liquid separates into a water-rich phase and an absorbing liquid-rich phase and cooling the absorbing liquid-rich phase to a temperature below its cloud point prior to recycling the absorbing liquid-rich phase for use as water-lean absorbing liquid in the absorption step.

An advantage of the process of the present invention is that water may be separated from the water-loaded absorbing liquid to form a water-rich phase at a temperature below that required to distill water from the absorbing liquid thereby resulting in a reduced energy consumption compared with a conventional dehydration process. A further advantage associated with regenerating the absorbing liquid at a relatively low temperature is that degradation of the absorbing liquid may be reduced or even eliminated.

It is envisaged that the gas which is saturated with water vapour may have condensed water entrained therein and that this entrained condensed water may be absorbed into the water-lean absorbing liquid together with the water vapour.

The gas saturated with water vapour may have a water content (water vapour and optionally entrained condensed water) of 10 kg per m$^3$.

Preferably, the refined gas has a water content of less than 2 kg per m$^3$, more preferably less than 1 kg per m$^3$, most preferably, less than 0.15 kg per m$^3$.

Preferably, the gas which is saturated with water vapour is at a pressure of at least 5 bar absolute, more preferably at least 10 bar absolute, most preferably at least 20 bar absolute, for example, at least 30 bar absolute.

A further advantage of the process of the present invention is that where the gas which is saturated with water vapour is at high pressure, the regeneration step can be achieved without a reduction in pressure of the water-loaded absorbing liquid or with a partial reduction in its pressure. Accordingly, the absorbing liquid-rich phase may be recycled to the absorption step (for use as water-lean absorbing liquid) at a relatively high pressure (thereby reducing or even eliminated the requirement for pressurising the water-lean absorbing liquid).

Preferably, the gas saturated with water vapour is natural gas or may be air from an air conditioning system or gas from a gas conditioning system or gas from a gas liquefaction system.

Where the gas saturated with water vapour is natural gas, it is envisaged that small amounts of hydrocarbons (gaseous hydrocarbons, vaporised hydrocarbons or entrained condensed hydrocarbons, for example, vaporised aromatic compounds or entrained condensed aromatic compounds) may be absorbed into the absorbing liquid together with the water. Preferably, the water-loaded absorbing liquid has a hydrocarbon content of less than 5% by weight, preferably less than 2.5% by weight, most preferably less than 1% by weight. An advantage of using the process of the present invention to remove water from natural gas is that any aromatic compounds which are absorbed into the water loaded absorbing liquid will partition into the absorbing liquid-rich phase during the regeneration step. There is no requirement to separate these aromatic compounds from the absorbing liquid-rich phase prior to recycle of the absorbing liquid rich phase to the absorption step. Accordingly, the process of the present invention results in a reduction in the emission of these harmful chemicals into the environment and/or eliminates the need for an aromatics recovery step.

The cloud point temperature of the water absorbing liquid is defined as the temperature at which the water-loaded absorbing liquid no longer exhibits single phase behaviour and becomes cloudy as the water starts to separate from the absorbing liquid. The cloud point temperature is therefore an indication of the temperature at which the water-loaded absorbing liquid will be expected to separate into a water-rich phase and an absorbing liquid-rich phase. The cloud point temperature is dependent upon the nature of the absorbing liquid and its water loading and is substantially insensitive to the pressure of the regeneration step. It will be appreciated that the absorbing liquid should be selected to suit the temperature of the gas from which the water is to be removed. Thus, the gas which is saturated with water vapour may be at an elevated temperature, ambient temperature, or may be chilled to a temperature below ambient conditions.

Suitably, the cloud point temperature of the absorbing liquid is in the range 1 to 120° C., preferably 10 to 90° C., more preferably 15 to 80° C., for example, 20 to 40° C.

Preferably, the absorption step takes place at a temperature which is at least 5° C. below the cloud point temperature of the absorbing liquid, more preferably, at least 10° C., most preferably at least 15° C. below the cloud point temperature. Where the gas which is brought into contact with the absorption liquid is at a temperature below the freezing point of water, it is essential that the absorbing liquid acts as an anti-freeze for water at the temperature of the absorption step. It is also essential that the cloud point temperature of the absorbing liquid (and hence the temperature of the regeneration step) is above the freezing point of water so as to avoid freezing of the water as it separates from the absorbing fluid.

In order to achieve a good separation of the water-rich phase and the absorbing liquid-rich phase, it is preferred to carry out the regeneration step at a temperature which is at least 2.5° C. above the cloud point temperature of the absorbing liquid, more preferably, at least 5° C. above the cloud point temperature.

Suitably, the regeneration step is carried out in a separator, for example a settling unit, decanter, hydrocyclone, electrostatic coalescer or centrifuge.

The water loaded absorbing liquid which is fed to the separator may be heated prior to entering the separator and/or is heated in the separator. It is preferred that the temperature of the water loaded absorbing liquid is maintained below its cloud point temperature until it enters the separator in order to mitigate the risk of premature phase separation leading to flow (e.g. slugging flow) and corrosion problems.

Where the gas which is saturated with water vapour contains carbon dioxide, it is envisaged that the absorbing liquid may also be selective for the absorption of carbon dioxide. The absorbed carbon dioxide may be separated from the water-loaded absorbing liquid by heating the water-loaded absorbing liquid. For example, the water-loaded absorbing liquid may be fed to a heated separator having a headspace therein such that absorbed carbon dioxide is liberated into the headspace under the action of heating. Optionally, the regeneration step is carried out with a reduction in the pressure of the water-loaded absorbing fluid in order to facilitate the liberation of carbon dioxide from the absorbing liquid. Suitably, the carbon dioxide is liberated from the water-loaded absorbing liquid at a temperature in the range 50 to 100° C., preferably 60 to 80° C. Suitably, the carbon dioxide is liberated from the water-loaded absorbing liquid at a pressure in the range 5 to 100 bar absolute, preferably 10 to 70 bar absolute. Where the regeneration step is carried out without a reduction in pressure of the water-loaded absorbing liquid (or with a partial reduction in its pressure), the separated absorbing liquid-rich phase may be subjected to a reduction in pressure, optionally with heating, in order to liberate any carbon dioxide which remains absorbed therein. Suitably, the separated absorbing-liquid rich phase is depressurized to a pressure in the range 1 to 30 bar absolute, preferably 5 to 20 bar absolute. Suitably, the separated absorbing-liquid rich phase is heated to a temperature in the range 50 to 100° C., preferably 60 to 80° C.

Suitably, the water absorbing liquid may be an amine, ether, alcohol, ester, carbonate or mixtures thereof.

Preferred amines include hexylamine, octylamine, nonylamine, N-methyl, diethylamine, N-methyl isopropylamine, N-methyl diisopropylamine, dipropylamine, diisopropylamine, di(prop-2-ene)amine, N-methyl n-butylamine, N-methyl n-pentylamine, N-methyloctylamine, amines of general formula $NHR^1R^2$ (wherein $R^1$ is ethyl and $R^2$ may be selected from ethyl, n-propyl, isopropyl, n-butyl, iso-butyl, and tert-butyl), N,N-dimethylethylamine, N,N-dimethylpropylamine, N,N-dimethylisopropylamine, N,N-dimethyl (prop-2-ene)amine, N,N-dimethylisobutylamine, N,N-dimethyltertbutylamine, N,N-diethylmethylamine, ethylmethylisopropylamine, triethylamine, and N-allyl-dimethylamine. Particularly preferred amines are triethylamine and N-allyl-dimethylamine. Other suitable amines include diamines of general formula $R^3{}_2(CH_2)_nNR^3{}_2$ wherein $R^3$ is methyl or ethyl and n is an integer in the range 2 to 6. Preferred diamines include N,N,N',N'-tetraethyl-1,2-ethanediamine, N,N,N',N'-tetraethyl-1,2-ethanediamine, N,N,N'N'-tetramethyl-1,6-heanediamine and N,N,N',N'-tetraethyl-1,3-propanediamine. The amine may also be an alkanolamine such as monoethanolamine (2-hydroxyethylamine), diethanolamine (bis(2-hydroxyethyl)amine)trietha- nolamine (tris(2-hydroxyethyl)amine), N-methyldiethylethanolamine, diglycolamine, and alkanolamines of the general formula $R^4{}_2NCH(R^5)CH(R^5)OH$ (wherein each $R^4$ is independently selected from the group consisting of ethyl, n-propyl, isopropyl, n-butyl, isobutyl and t-butyl and $R^5$ is H or methyl). Preferred alkanolamines include 2-(diisopropylamino)ethanol, and 1-diethylamino-2-propanol.

Preferred ethers are of general formula $R^6O(CH_2CH_2O)_nR^7$ wherein $R^6$ is selected from the group consisting of H, methyl and ethyl, $R^7$ is selected from the group consisting of ethyl, n-propyl, isopropyl, n-butyl, isobutyl and t-butyl and n is 1 or 2. Particularly preferred ethers of this general formula include ethylene glycol butyl ether (2-butoxyethanol), diethylene glycol diethyl ether (2-ethoxyethyl ether), and diethylene glycol tert-butyl methyl ether. Other suitable ethers are glycerol ethers of general formula $R^8OCH_2CH(OH)CH_2OR^9$ (wherein $R^8$ is methyl or ethyl and $R^9$ is selected from n-propyl, isopropyl, n-butyl, isobutyl and t-butyl) such as ethyl n-propyl glycerol ether, ethyl isopropyl glycerol ether, methyl n-butyl glycerol ether, ethyl n-butyl glycerol ether, methyl tert-butyl glycerol ether, diisopropyl glycerol ether, methyl n-amyl glycerol ether, methyl isoamyl glycerol ether, methyl 2-amyl glycerol ether, propylene glycol n-propyl ether, and ethyl n-hexyl oxyethyl glycerol ether.

Preferred alcohols include 2-butanol, cyclohexanol, cyclohexylmethanol, benzyl alcohol, 3,3-dimethyl-2-butanol, 3-heptanol, 2-octanol, 3-octanol, 1-nonanol, 2-nonanol, 1-decanol, 2-methylcyclohexanol, 2-ethyl-1-butanol, 3,3,5-trimethyl-1-hexanol, 3,5,5-trimethyl-1-hexanol, 2,6-dimethyl-4-heptanol, 3-methyl-1-pentanol, 5-methyl-2-hexanol, cyclopentanol, 3-methylcyclohexanol, 4-methylcyclohexanol, 2,6-dimethylcyclohexanol, cycloheptanol, cyclooctanol, 2-methyl-1-propanol, 1-butanol, 4-heptanol, 1-undecanol, 1-dodecanol, 1-phenyl-1-propanol, and diols such as 1,3-dimethylbutoxypropanediol.

Preferred esters include esters propyl formate, isopropyl formate, butyl formate, isobutyl formate, pentyl formate, cyclohexyl formate, isoamyl formate, hexyl formate, heptyl formate, octyl formate, ethyl acetate, propyl acetate, isopropyl acetate, sec-butyl acetate, isobutyl acetate, butyl acetate, tert-butyl acetate, pentyl acetate, isopentyl acetate, hexyl acetate, cyclohexyl acetate, heptyl acetate, isononyl acetate, benzyl acetate, methyl chloroacetate, ethyl chloroacetate, methyl dichloroacetate, methyl trichloroacetate, methyl trimethylacetate, ethyl trimethylacetate, methyl propionate, ethyl propionate, propyl propionate, methyl 2-chloropropionate, butyl propionate, isopentyl propionate, hexyl propionate, cyclohexyl propionate, methyl butyrate, methyl isobutyrate, ethyl isobutyrate, ethyl butyrate, propyl butyrate, isopropyl butyrate, butyl butyrate, butyl isobutyrate, isobutyl isobutyrate, methyl 4-chlorobutyrate, pentyl butyrate, isopentyl butyrate, hexyl isobutyrate, methyl enanthate, methyl caproate, ethyl caproate, ethyl caprylate, methyl valerate, ethyl isovalerate, diethyl oxalate, diethyl succinate, dimethyl glutarate, dimethyl adipate, diethyl adipate, methyl salicylate, ethyl salicylate, dimethyl maleate, methyl benzoate, ethyl benzoate and esters of the general formula $R^{10}C(O)O(CH_2CH_2O)_nR^{11}$ (wherein $R^{10}$ is methyl or ethyl, $R^{11}$ is selected from the group consisting of ethyl, n-propyl, isopropyl, n-butyl, isobutyl and t-butyl and n is 1 or 2) such as diethylene glycol ethyl ether acetate.

Preferred carbonates include dimethyl carbonate and diethyl carbonate.

The water absorbing liquid may also be an ethylene oxide homopolymer or a copolymer of ethylene oxide and propylene oxide having a molecular weight in the range 10,000 to 100,000. The polymers may be used as such or may be dissolved in a protic solvent. Suitable protic solvents include alcohols (for example, methanol and ethanol) glycols (for example, ethylene glycol monobutyl ether), dimethylformamide, and dimethylsulfoxide.

The ethylene oxide homopolymer may have the following general formula:

$$R^1—(CH_2CH_2O)_m—R^2$$

wherein $R^1$ may be selected from H, or a $C_1$ to $C_6$ straight chain or branched chain aliphatic group, $R^2$ is a $C_1$ to $C_6$ straight chain or branched chain aliphatic group, and m is an integer. Where $R^1$ is a $C_1$ to $C_6$ straight or branched chain aliphatic groups, $R^1$ and $R^2$ may be the same or different. Preferred $C_1$ to $C_6$ straight or branched chain aliphatic groups include methyl, ethyl, n-propyl, isopropyl, n-butyl, isobutyl and tert-butyl.

Alternatively, the ethylene oxide homopolymer may have the general formula:

$$R^3—(CH_2CH_2O)_y—R^4$$

wherein $R^3$ is a $C_2$ to $C_{16}$ straight chain or branched chain aliphatic group, $R^4$ is H or a $C_1$ to $C_{16}$ straight chain or branched chain aliphatic group and y is an integer in the range 2 to 16.

The copolymer of ethylene oxide and propylene oxide may be a random block copolymer of the following general formula:

$$R^1—(CH_2CH_2O)_m(CH_2CHMeO)_n—R^2$$

wherein $R^1$ and $R^2$ are as defined above, Me is methyl, and m and n are integers.

Preferably, the water-loaded absorbing liquid, which is heated in the regeneration step, has a water loading of at least 5% by weight, more preferably at least 7.5% by weight, most preferably, at least 10% by weight. For example, the water-loaded absorbing liquid may have a water loading in the range 10 to 30% by weight, preferably 10 to 20% by weight.

The absorbing liquid-rich phase may contain low amounts of water. Preferably, the absorbing liquid-rich phase contains less than 2.5% weight of water, more preferably less than 1% weight, most preferably less than 0.5% weight of water. Where the water-lean absorbing liquid contains such low amounts of water, there is no requirement to remove the water contaminant prior to recycling the absorbing liquid to the absorption step. However, where the absorbing liquid-rich phase contains higher amounts of water (for example, greater than 5% weight of water) it may be necessary to distill at least a portion of the water from the absorbing liquid prior to recycling the absorbing liquid to the absorption step. Nevertheless, the energy consumed in distilling the water contaminant from the absorbing liquid-rich phase is less than that which would be required to remove water from the water-loaded absorbing liquid solely by the action of distillation.

The water-rich phase may contain low amounts of absorbing liquid. Preferably, the water-rich phase contains less than 2.5% weight of absorbing liquid, more preferably, less than 1% weight and most preferably less than 0.5% weight of absorbing liquid. Preferably, at least a portion of the contaminating absorbing liquid, preferably substantially all of the contaminating absorbing liquid is removed from the water-rich phase in a water purification step. The absorbing liquid which is removed from the water-rich phase is then recycled to the absorption step.

Suitably, the water purification step comprises contacting the water-rich phase with a wash solvent which is immiscible with water such that at least part of the absorbing liquid present in the water-rich phase is extracted into the wash solvent to produce an extract phase and a purified water phase. The extract phase is then separated from the purified water phase. In order to facilitate separation of the wash solvent and the absorbing liquid, it is preferred that the wash solvent has a boiling point which is substantially lower than that of the absorbing liquid thereby allowing the wash solvent to be separated from the absorbing liquid as an overhead fraction by distillation. The separated wash solvent (overhead fraction) may then recycled to the purification step while the absorbing liquid (bottom fraction) may be recycled to the absorption step.

Where the gas which is saturated with water is natural gas, the absorbing liquid-rich phase may contain absorbed hydrocarbons. Suitably, the extract phase from the water purification step may be combined with the absorbing liquid-rich phase and the combined phases may be fed to a distillation column wherein the wash solvent together with any light hydrocarbons are separated from the absorbing liquid as an overhead fraction. The overhead fraction is then cooled to condense the wash solvent and the condensed wash solvent is separated from any gaseous hydrocarbons using a conventional gas-liquid separator. The wash solvent is then recycled to the water purification step. Preferably, the gaseous hydrocarbons are combined with the refined natural gas.

Suitably, the wash solvent has a boiling point which is at least 20° C. below, more preferably at least 40° C. below the boiling point of the absorbing liquid (in order to mitigate the risk of forming an azeotropic mixture in the distillation column).

Preferred wash solvents include light end hydrocarbons having from 5 to 10 carbons, preferably, from 5 to 8 carbons, and mixtures thereof. Examples of light end hydrocarbons include alkanes and cycloalkanes such as n-pentane, methylcyclopentane, n-hexane, cyclohexane, mixtures of hexane isomers, n-heptane, mixtures of heptane isomers, n-octane and mixtures of octane isomers. The wash solvent may also be an aromatic hydrocarbon such as toluene and xylene.

Figure 1:
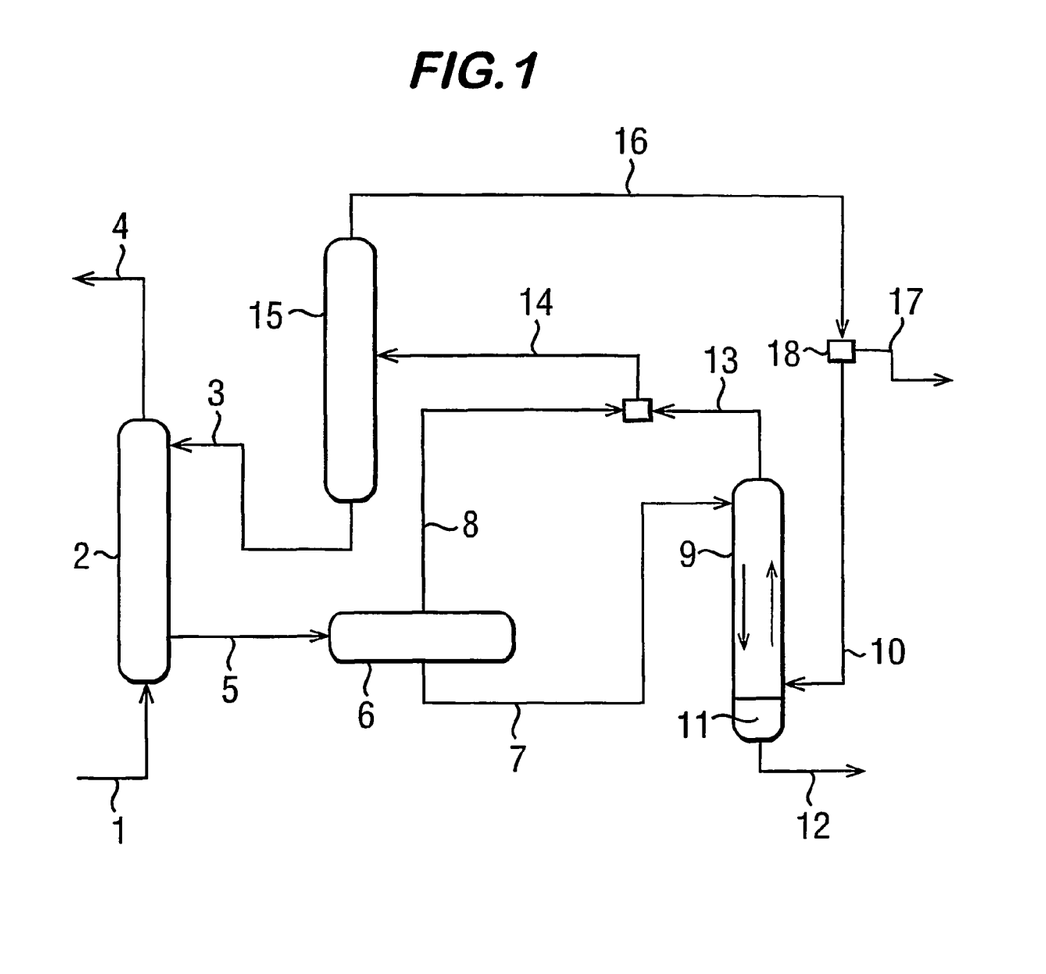
FIG. 1 is a schematic illustration of an embodiment of the process of the present invention in which water is absorbed from a gas saturated with water vapour into a water lean absorbing liquid in an absorption tower (2) and the resulting water-loaded absorbing liquid (5) is regenerated in a heated separator (6) by heating the water-loaded absorbing liquid to above its cloud point temperature.
Figure 2:
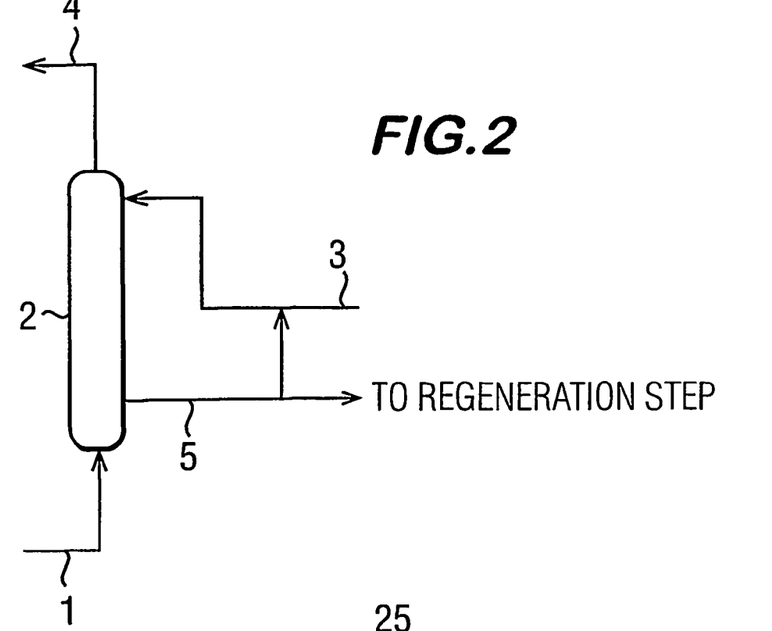
FIG. 2 is a modification of the process scheme illustrated in FIG. 1 in which a portion of the water-loaded absorption liquid which is withdrawn from the absorption tower (2) is combined with the regenerated absorption liquid (3) and is reintroduced to the absorption tower (2).
Figure 3:
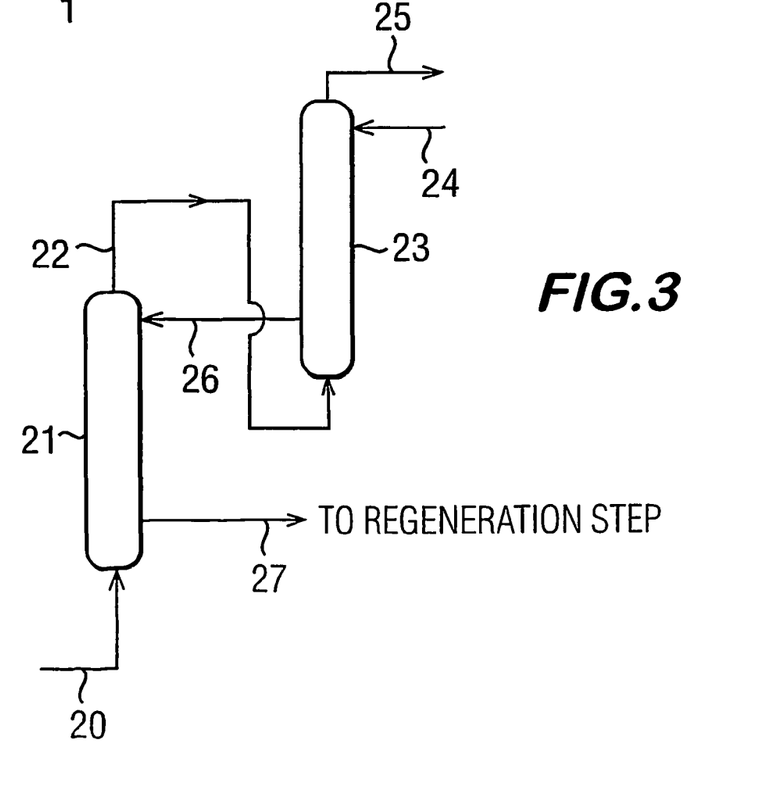
FIG. 3 is a schematic illustration of a typical countercurrent flow process of the present invention.

The invention will now be illustrated with the aid of FIGS. 1 to 3 which represent schematic diagrams of three embodiments of the process of the present invention.

DETAILED DESCRIPTION OF PREFERRED EMBODIMENTS

In FIG. 1, a gas which is saturated with water vapour (1) is fed to an absorption tower (2) at or near the bottom thereof. The absorption tower may be packed, for example, with an irregular packing material and/or may have plates therein so that the ascending gas comes into efficient gas liquid contact with a water-lean absorbing liquid (3) fed to the upper part of the absorption tower (2). Refined gas (4) having a reduced water vapour content, as a result of being contacted with the water-lean absorbing liquid (3), is discharged from the top of the absorption tower (2). Water-loaded absorbing liquid (5) is withdrawn from near the bottom of the absorption tower (2) and is transferred to the regeneration step where it is regenerated. The water-loaded absorbing liquid (5) may have absorbed therein components of the gas (1) which were absorbed together with the water (such as trace amounts of hydrocarbons).

The regeneration step comprises a heated separator (6) in which the water-loaded absorbing liquid (5) is heated to a temperature above the cloud point temperature of the absorbing liquid and separates into a water-rich phase (7) and an absorbing liquid-rich phase (8). Generally, the water-rich phase (7) will be denser than the absorbing liquid-rich phase (8) in which case the water-rich phase (7) forms the bottom phase in the separator (6).

The water-rich phase (7) is withdrawn from the separator (6) and is fed to a wash column (9) near the top thereof where it is brought into liquid-liquid contact with a wash solvent (10) having a density lower than that of water. The wash solvent (10) is fed to the lower part of the wash column (9) above a sump region (11). The water-rich phase (7) and the wash solvent (10) pass in a counter current fashion through the wash column such that the absorbing liquid which contaminates the water-rich phase (7) is extracted into the wash solvent (10) and purified water collects in the sump region (11). A purified water stream (12) is withdrawn from the sump region (11) while an extract stream (13) comprising wash solvent and extracted absorbing liquid is removed from the top of the wash column (9). Alternatively, it is envisaged that the water-rich phase and wash solvent may be contacted in a mixing vessel and the resulting mixture may then be passed to a separator where an extract phase is separated from a purified water phase.

The extract stream (13) from the wash column (9) is combined with the absorbing liquid-rich phase (8) which is withdrawn from at or near the top of the heated separator (6) and the combined stream (14) is passed to a distillation column (15) where the wash solvent and any low boiling components of the treated gas (which were absorbed into the absorbing liquid together with the water) are separated as an overhead fraction (16) from the absorbing liquid. The overhead fraction (16) is cooled to condense out the wash solvent (10) which is separated from any gaseous components (17) of the overhead fraction (16) in a separator (18). The gaseous components are combined with the refined gas (4) while the condensed wash solvent (10) is recycled to the wash column (9). The bottom fraction from the distillation column is recycled to the absorption tower (2) for use as water-lean absorbing liquid (3).

FIG. 2 is a modification of the process illustrated in FIG. 1 in which a portion of the water-loaded absorption liquid which is withdrawn from the absorption tower is combined with the regenerated absorption liquid (3) and is reintroduced into the absorption tower (2). The remainder of the water-loaded absorption liquid is passed to the regeneration step (not shown). This modification of the process of FIG. 1 results in an increase in the water loading of the absorbing liquid. It is also envisaged that a portion of the refined gas (4) which is withdrawn from the top of the absorption tower could be combined with fresh gas which is saturated with water and that the combined gas stream could be fed to the bottom of the absorption tower thereby further reducing the water content of the refined gas (not shown).

A typical continuous counter-current flow process is illustrated in FIG. 3. A gas saturated with water vapour (20) is fed to a first absorption tower (21) and a gas having a reduced water content (22) is withdrawn from the top of the first absorption tower (21) and is fed to the bottom of a second absorption tower (23). Regenerated water-lean absorbing liquid (24) is fed to the second absorption tower (23) while gas which is further reduced in water content (25) is withdrawn from the top of the second absorption tower (23). Absorbing liquid which is partially loaded with water (26) is withdrawn from the second absorption tower and is fed to the first absorption tower (21). Absorbing liquid having an increased loading of water (27) is removed from the first absorption tower and is passed to the regeneration step (not shown). The number of absorption towers employed in a continuous counter-current flow configuration process is dependent on the level of water in the gas and the desired water-loading of the absorbing liquid which is to be fed to the regeneration step. Suitably, 2–6, preferably 2–3 absorption towers are employed.

EXAMPLES

Example 1

The results given below in Table 1 show the effect of water loading on the cloud point temperature of a mixture of water and N-allyl-dimethylamine.

TABLE 1

| Amine (g) | Water (g) | % amine (by weight) | % water (by weight) | Cloud Point Temperature (° C.) |
|---|---|---|---|---|
| 1 | 9 | 10 | 90 | 57.9 |
| 2 | 9 | 18.2 | 81.8 | 48 |
| 3 | 9 | 25 | 75 | 47.5 |
| 5 | 9 | 35.7 | 64.3 | 47.6 |
| 7 | 9 | 43.8 | 56.2 | 47.8 |
| 10 | 9 | 52.6 | 47.4 | 49.1 |
| 6.39 | 0.5 | 92.7 | 7.3 | — |
| 6.39 | 1 | 86.5 | 13.5 | — |
| 6.39 | 2 | 76.2 | 23.8 | 59.2 |
| 6.39 | 4 | 61.5 | 38.5 | 50.4 |
| 6.39 | 5 | 56.1 | 43.9 | 49.1 |

It can be seen that at water loadings of between 38.5 and 81.8% weight, the cloud point temperature remains relatively constant at approximately 50° C. and that the cloud point temperature increases dramatically at water loadings outside of this range. Accordingly, N-allyl-dimethylamine is suitable for use as a water absorbing fluid in the process of the present invention.

Example 2

The results given below in Table 2 show the effect of water loading on the cloud point temperature of a mixture of water and triethylamine.

TABLE 2

| Amine (g) | Water (g) | % amine (by weight) | % water (by weight) | Cloud Point Temperature (° C.) |
|---|---|---|---|---|
| 9.9 | 0.1 | 99 | 1 | — |
| 9.8 | 0.2 | 98 | 2 | 65 |
| 9.6 | 0.4 | 96 | 4 | 38.7 |
| 9.5 | 0.5 | 95 | 5 | 20 |
| 9 | 1 | 90 | 10 | 18.5 |
| 8 | 2 | 80 | 20 | 17.4 |
| 7 | 3 | 70 | 30 | 17.8 |
| 6 | 4 | 60 | 40 | 17.7 |
| 5 | 5 | 50 | 50 | 18 |
| 4 | 6 | 40 | 60 | 17.2 |
| 3 | 7 | 30 | 70 | 17.4 |
| 2 | 8 | 20 | 80 | 17.2 |
| 1 | 9 | 10 | 90 | 19.6 |
| 0.5 | 9.5 | 5 | 95 | 32.8 |
| 0.4 | 9.6 | 4 | 96 | 39.2 |
| 0.2 | 9.8 | 2 | 98 | — |
| 0.1 | 9.9 | 1 | 99 | — |

It can be seen that at water loadings of between 5 and 90% by weight, the cloud point temperature remains relatively constant at between 17–20° C. and that the cloud point temperature increases dramatically at water loadings outside of this range. Accordingly, triethylamine is highly suitable for use as a water absorbing fluid in the process of the present invention.

Example 3

The results given below in Table 3 show the effect of water loading on the cloud point temperature of a mixture of water and N,N,N',N'-tetraethyl-1,2-ethanediamine.

TABLE 3

| Amine (g) | Water (g) | % amine (by weight) | % water (by weight) | Cloud Point Temperature (° C.) |
|---|---|---|---|---|
| 9.5 | 0.5 | 95 | 5 | — |
| 9 | 1 | 90 | 10 | 14.1 |
| 8 | 2 | 80 | 20 | 25.4 |
| 7 | 3 | 70 | 30 | 25.8 |
| 6 | 4 | 60 | 40 | 26.4 |
| 5 | 5 | 50 | 50 | 26.9 |
| 4 | 6 | 40 | 60 | 28.2 |
| 3 | 7 | 30 | 70 | 28.8 |
| 2 | 8 | 20 | 80 | 31.8 |
| 1 | 9 | 10 | 90 | 38.9 |
| 0.5 | 9.5 | 5 | 95 | 48.8 |

It can be seen that at water loadings of between 20% and 70% weight, the cloud point temperature remains relatively constant at approximately 25 to 29° C. and that the cloud point temperature increases dramatically at water loadings above 70% weight. Accordingly, N,N,N',N'-tetraethyl-1,2-ethanediamine is suitable for use as a water absorbing fluid in the process of the present invention.

Example 4

The results given below in Table 4 show the effect of water loading on the cloud point temperature of a mixture of water and N,N,N',N'-tetramethyl-1,6-hexanediamine

TABLE 4

| Amine (g) | Water (g) | % amine (by weight) | % water (by weight) | Cloud Point Temperature (° C.) |
|---|---|---|---|---|
| 9.5 | 0.5 | 95 | 5 | 100 |
| 9 | 1 | 90 | 10 | 100 |
| 8 | 2 | 80 | 20 | 74.5 |
| 7 | 3 | 70 | 30 | 67.3 |
| 6 | 4 | 60 | 40 | 62.1 |
| 5 | 5 | 50 | 50 | 58.9 |
| 4 | 6 | 40 | 60 | 57.2 |
| 3 | 7 | 30 | 70 | 56.4 |
| 2 | 8 | 20 | 80 | 56.4 |
| 1 | 9 | 10 | 90 | 56.5 |
| 0.5 | 9.5 | 5 | 95 | 60.3 |

It can be seen that at water loadings of between 30% and 95% weight, the cloud point temperature remains relatively constant at approximately 60° C. and that the cloud point temperature increases dramatically at water loadings below 30% weight. Accordingly, N,N,N',N'-tetramethyl-1,6-hexanediamine is suitable for use as a water absorbing fluid in the process of the present invention.

Example 5

The results given below in Table 5 show the effect of water loading on the cloud point temperature of a mixture of water and N,N,N',N'-tetraethyl-1,3-propanediamine.

TABLE 5

| Amine (g) | Water (g) | % amine (by weight) | % water (by weight) | Cloud Point Temperature (° C.) |
|---|---|---|---|---|
| 9.5 | 0.5 | 95 | 5 | 12.5 |
| 9 | 1 | 90 | 10 | 18.4 |
| 8 | 2 | 80 | 20 | 21.0 |
| 7 | 3 | 70 | 30 | 21.6 |
| 6 | 4 | 60 | 40 | 21.6 |
| 5 | 5 | 50 | 50 | 21.6 |
| 4 | 6 | 40 | 60 | 21.8 |
| 3 | 7 | 30 | 70 | 21.9 |
| 2 | 8 | 20 | 80 | 21.7 |
| 1 | 9 | 10 | 90 | 23.9 |
| 0.5 | 9.5 | 5 | 95 | 32.7 |

It can be seen that at water loadings of between 10% and 90% weight, the cloud point temperature remains relatively constant at approximately 22° C. and that the cloud point temperature increases at water loadings above 90% weight. Accordingly, N,N,N',N'-tetraethyl-1,3-propanediamine is suitable for use as a water absorbing fluid in the process of the present invention.

Example 6

The results given below in Table 6 show the effect of water loading on the cloud point temperature of a mixture of water and 2-(diisopropylamino)ethanol.

TABLE 6

| Alkanolamine (g) | Water (g) | % alkanolamine (by weight) | % water (by weight) | Cloud Point Temperature (° C.) |
|---|---|---|---|---|
| 9.5 | 0.5 | 95 | 5 | 100 |
| 9 | 1 | 90 | 10 | 29.1 |

TABLE 6-continued

| Alkanolamine (g) | Water (g) | % alkanolamine (by weight) | % water (by weight) | Cloud Point Temperature (° C.) |
|---|---|---|---|---|
| 8 | 2 | 80 | 20 | 17.2 |
| 7 | 3 | 70 | 30 | 14.5 |
| 6 | 4 | 60 | 40 | 13.6 |
| 5 | 5 | 50 | 50 | 13.6 |
| 4 | 6 | 40 | 60 | 13.6 |
| 3 | 7 | 30 | 70 | 13.6 |
| 2 | 8 | 20 | 80 | 15.6 |
| 1 | 9 | 10 | 90 | 21.9 |
| 0.5 | 9.5 | 5 | 95 | 41.4 |

It can be seen that at water loadings of between 30 and 80% by weight, the cloud point temperature remains relatively constant at between 13.6–15.6° C. and that the cloud point temperature increases at water loadings outside of this range. Accordingly, 2-(diisopropylamino)ethanol is highly suitable for use as a water absorbing fluid in the process of the present invention.

Example 7

The results given below in Table 7 show the effect of water loading on the cloud point temperature of a mixture of water and 1-diethylamino-2-propanol.

TABLE 7

| Alkanolamine (g) | Water (g) | % alkanolamine (by weight) | % water (by weight) | Cloud Point Temperature (° C.) |
|---|---|---|---|---|
| 9.5 | 0.5 | 95 | 5 | 100 |
| 9 | 1 | 90 | 10 | 42.7 |
| 8 | 2 | 80 | 20 | 30 |
| 7 | 3 | 70 | 30 | 29.4 |
| 6 | 4 | 60 | 40 | 29.3 |
| 5 | 5 | 50 | 50 | 29.6 |
| 4 | 6 | 40 | 60 | 29.7 |
| 3 | 7 | 30 | 70 | 30.5 |
| 2 | 8 | 20 | 80 | 35 |
| 1 | 9 | 10 | 90 | 50.4 |
| 0.5 | 9.5 | 5 | 95 | 75.8 |

It can be seen that at water loadings of between 20 and 70% by weight, the cloud point temperature remains relatively constant at between 29.3–30.5° C. and that the cloud point temperature increases dramatically at water loadings outside of this range. Accordingly, 1-diethylamino-2-propanol is highly suitable for use as a water absorbing fluid in the process of the present invention.

Example 8

The results given below in Table 8 show the effect of water loading on the cloud point temperature of a mixture of water and ethylene glycol butyl ether.

TABLE 8

| Glycol ether (g) | Water (g) | % glycol ether (by weight) | % water (by weight) | Cloud Point Temperature (° C.) |
|---|---|---|---|---|
| 9.5 | 0.5 | 95 | 5 | 100 |
| 9 | 1 | 90 | 10 | 100 |
| 8 | 2 | 80 | 20 | 100 |
| 7 | 3 | 70 | 30 | 100 |

TABLE 8-continued

| Glycol ether (g) | Water (g) | % glycol ether (by weight) | % water (by weight) | Cloud Point Temperature (° C.) |
|---|---|---|---|---|
| 6 | 4 | 60 | 40 | 100 |
| 5 | 5 | 50 | 50 | 55.2 |
| 4 | 6 | 40 | 60 | 52.5 |
| 3 | 7 | 30 | 70 | 49.5 |
| 2 | 8 | 20 | 80 | 49.3 |
| 1 | 9 | 10 | 90 | 66.4 |
| 0.5 | 9.5 | 5 | 95 | 100 |

It can be seen that at water loadings of between 60 and 80% by weight, the cloud point temperature remains relatively constant at between 49.3–52.5° C. and that the cloud point temperature increases at water loadings outside of this range. Accordingly, ethylene glycol butyl ether is highly suitable for use as a water absorbing fluid in the process of the present invention.

Example 9

The results given below in Table 9 show the effect of water loading on the cloud point temperature of a mixture of water and 2-ethoxyethylether.

TABLE 9

| Ether (g) | Water (g) | % ether (by weight) | % water (by weight) | Cloud Point Temperature (° C.) |
|---|---|---|---|---|
| 9.5 | 0.5 | 95 | 5 | 100 |
| 9 | 1 | 90 | 10 | 100 |
| 8.5 | 1.5 | 85 | 15 | 37.6 |
| 8 | 2 | 80 | 20 | 29.9 |
| 7 | 3 | 70 | 30 | 27.5 |
| 6 | 4 | 60 | 40 | 27.8 |
| 5 | 5 | 50 | 50 | 31.8 |
| 4 | 6 | 40 | 60 | 40.9 |
| 3 | 7 | 30 | 70 | 48.9 |
| 2 | 8 | 20 | 80 | 62 |
| 1 | 9 | 10 | 90 | 90.7 |
| 0.5 | 9.5 | 5 | 95 | 100 |

It can be seen that at water loadings of between 20 and 50% by weight, the cloud point temperature remains relatively constant at between 27.5–31.8° C. and that the cloud point temperature increases at water loadings outside of this range. Accordingly, 2-ethoxyethylether is highly suitable for use as a water absorbing fluid in the process of the present invention.

Example 10

The results given below in Table 10 show the effect of water loading on the cloud point temperature of a mixture of water and diethylene glycol tert-butyl methyl ether.

TABLE 10

| Glycol ether (g) | Water (g) | % glycol ether (by weight) | % water (by weight) | Cloud Point Temperature (° C.) |
|---|---|---|---|---|
| 9.5 | 0.5 | 95 | 5 | 100 |
| 9 | 1 | 90 | 10 | 44.3 |
| 8 | 2 | 80 | 20 | 19.9 |
| 7 | 3 | 70 | 30 | 19.4 |
| 6 | 4 | 60 | 40 | 19.4 |

TABLE 10-continued

| Glycol ether (g) | Water (g) | % glycol ether (by weight) | % water (by weight) | Cloud Point Temperature (° C.) |
|---|---|---|---|---|
| 5 | 5 | 50 | 50 | 20.8 |
| 4 | 6 | 40 | 60 | 24 |
| 3 | 7 | 30 | 70 | 28.3 |
| 2 | 8 | 20 | 80 | 38.9 |
| 1 | 9 | 10 | 90 | 51.9 |
| 0.5 | 9.5 | 5 | 95 | 71.7 |

It can be seen that at water loadings of between 20 and 50% by weight, the cloud point temperature remains relatively constant at between 19.4 and 20.8° C. and that the cloud point temperature increases at water loadings outside of this range. Accordingly, diethylene glycol tert-butyl methyl ether is highly suitable for use as a water absorbing fluid in the process of the present invention.

Example 11

The results given below in Table 11 show the effect of water loading on the cloud point temperature of a mixture of water and diethylene glycol monoethyl ether acetate.

TABLE 11

| Glycol ether (g) | Water (g) | % glycol ether (by weight) | % water (by weight) | Cloud Point Temperature (° C.) |
|---|---|---|---|---|
| 9.5 | 0.5 | 95 | 5 | 100 |
| 9 | 1 | 90 | 10 | 100 |
| 8 | 2 | 80 | 20 | 85.5 |
| 7 | 3 | 70 | 30 | 59.4 |
| 6 | 4 | 60 | 40 | 47.8 |
| 5 | 5 | 50 | 50 | 41.7 |
| 4 | 6 | 40 | 60 | 40.2 |
| 3 | 7 | 30 | 70 | 40.8 |
| 2 | 8 | 20 | 80 | 52.6 |
| 1 | 9 | 10 | 90 | 100 |
| 0.5 | 9.5 | 5 | 95 | 100 |

It can be seen that at water loadings of between 50 and 70% by weight, the cloud point temperature remains relatively constant at between 40.2–41.7° C. and that the cloud point temperature increases at water loadings outside of this range. Accordingly, diethylene glycol monoethyl ether acetate is suitable for use as a water absorbing fluid in the process of the present invention.

The invention claimed is:

1. A process for the removal of water from a gas which comprises:
   (a) an absorption step of bringing a gas saturated with water vapour into gas-liquid contact with a water-lean absorbing liquid comprising a water absorbing liquid whereby water vapour present in the gas is absorbed into the water-lean absorbing liquid to produce a refined gas having a reduced water vapour content and a water-loaded absorbing liquid having a cloud point temperature above the freezing point of water wherein the temperature of the absorption step is below the cloud point temperature of the water-loaded absorbing fluid; and
   (b) a regeneration step of heating the water-loaded absorbing liquid to above the cloud point temperature of the water-loaded absorbing liquid whereby the water-loaded absorbing liquid separates into a water-rich phase and an absorbing liquid-rich phase and cooling the absorbing liquid-rich phase to a temperature below its cloud point prior to recycling the absorbing liquid-rich phase for use as water-lean absorbing liquid in the absorption step.

2. A process according to claim 1 wherein the gas saturated with water vapour has a water content of 10 kg per $m^3$.

3. A process according to claim 1 wherein the refined gas has a water content of less than 2 kg per $m^3$.

4. A process according to claim 3 wherein the refined gas has a water content of less than 0.15 kg per $m^3$.

5. A process according to claim 1 wherein the gas which is saturated with water vapour is at a pressure of at least 20 bar absolute.

6. A process according to claim 1 wherein the gas saturated with water vapour is selected from natural gas, air from an air conditioning system, gas from a gas conditioning system and gas from a gas liquefaction system.

7. A process as claimed in claim 6 wherein the gas saturated with water vapour is natural gas and the water-loaded absorbing liquid has a hydrocarbon content of less than 5% by weight.

8. A process as claimed in claim 1 wherein the cloud point temperature of the water-loaded absorbing liquid is in the range 1 to 120° C.

9. A process as claimed in claim 8 wherein the cloud point temperature of the water-loaded absorbing liquid is in the range 15 to 80° C.

10. A process as claimed in claim 1 wherein the absorption step takes place at a temperature which is at least 5° C. below the cloud point temperature of the water-loaded absorbing liquid.

11. A process as claimed in claim 10 wherein the absorption step takes place at a temperature which is at least 15° C. below the cloud point temperature of the water-loaded absorbing liquid.

12. A process as claimed in claim 1 wherein the absorption and regeneration steps take place at a temperature below and above the freezing point of water respectively and the absorbing liquid is an anti-freeze for water at the temperature of the absorption step.

13. A process as claimed in claim 1 wherein the regeneration step is carried out at a temperature which is at least 2.5° C. above the cloud point temperature of the water-loaded absorbing liquid.

14. A process as claimed in claim 13 wherein the regeneration step is carried out at a temperature which is at least 5° C. above the cloud point temperature of the water-loaded absorbing liquid.

15. A process as claimed in claim 1 wherein the regeneration step is carried out in a separator selected from a settling unit, decanter, hydrocyclone, electrostatic coalescer and a centrifuge.

16. A process as claimed in claim 1 wherein the gas which is saturated with water vapour contains carbon dioxide, the absorbing liquid is selective for the absorption of carbon dioxide and the absorbed carbon dioxide is separated from the water-loaded absorbing liquid by heating the water-loaded absorbing liquid to a temperature in the range 60 to 80° C. at a pressure in the range 10 to 70 bar absolute.

17. A process as claimed in claim 1 wherein the water absorbing liquid is an amine, ether, alcohol, ester, carbonate, an ethylene oxide homopolymer having a molecular weight in the range 10,000 to 100,000, a copolymer of ethylene oxide and propylene oxide having a molecular weight in the range 10,000 to 100,000 or mixtures thereof.

18. A process as claimed in claim 17 wherein the amine is selected from hexylamine, octylamine, nonylamine, N-methyl, diethylamine, N-methyl isopropylamine, N-methyl diisopropylamine, dipropylamine, diisopropylamine, di(prop-2-ene)amine, N-methyl n-butylamine, N-methyl n-pentylamine, N-methyloctylamine, amines of general formula $NHR^1R^2$ (wherein $R^1$ is ethyl and $R^2$ may be selected from ethyl, n-propyl, isopropyl, n-butyl, iso-butyl, and tert-butyl), N,N-dimethylethylamine, N,N-dimethylpropylamine, N,N-dimethylisopropylamine, N,N-dimethyl(prop-2-ene)amine, N,N-dimethylisobutylamine, N,N-dimethyltertbutylamine, N,N-diethylmethylamime, ethylmethylisopropylamine, triethylamine, N-allyl-dimethylamine diamines of general formula $R^3{}_2(CH_2)_n NR^3{}_2$ (wherein $R^3$ is methyl or ethyl and n is an integer in the range 2 to 6), monoethanolamine, diethanolamine, triethanolamine, N-methyldiethylethanolamine, diglycolamine, and alkanolamines of the general formula $R^4{}_2NCH(R^5)CH(R^5)OH$ (wherein each $R^4$ is independently selected from the group consisting of ethyl, n-propyl, isopropyl, n-butyl, isobutyl and t-butyl and $R^5$ is H or methyl).

19. A process as claimed in claim 17 wherein the ether is of general formula $R^6O(CH_2CH_2O)_n R^7$ wherein $R^6$ is selected from the group consisting of H, methyl and ethyl, $R^7$ is selected from the group consisting of ethyl) n-propyl, isopropyl, n-butyl, isobutyl and t-butyl and n is 1 or 2 or is a glycerol ether of general formula $R^8OCH_2CH(OH)CH_2OR^9$ wherein $R^8$ is methyl or ethyl and $R^9$ is selected from n-propyl, isopropyl, n-butyl, isobutyl and t-butyl.

20. A process as claimed in claim 17 wherein the alcohol is selected from the group consisting of 2-butanol, cyclohexanol, cyclohexylmethanol, benzyl alcohol, 33-dimethyl-2-butanol, 3-heptanol, 2-octanol, 3-octanol, 1-nonanol, 2-nonanol, 1-decanol, 2-methylcyclohexanol, 2-ethyl-1-butanol, 3,3,5-trimethyl-1-hexanol, 3,5,5-trimethyl-1-hexanol, 2,6-dimethyl-4-heptanol, 3-methyl-1-pentanol, 5-methyl-2-hexanol, cyclopentanol, 3-methylcyclohexanol, 4-methylcyclohexanol, 2,6-dimethylcyclohexanol, cycloheptanol, cyclooctanol, 2-methyl-1-propanol, 1-butanol, 4-heptanol, 1-undecanol, 1-dodecanol, 1-phenyl-1-propanol, and diols such as 1,3-dimethylbutoxypropanediol.

21. A process as claimed in claim 17 wherein the ester is selected from the group consisting of propyl formate, isopropyl formate, butyl formate, isobutyl formate, pentyl formate, cyclohexyl formate, isoamyl formate, hexyl formate, heptyl formate, octyl formate, ethyl acetate, propyl acetate, isopropyl acetate, sec-butyl acetate, isobutyl acetate, butyl acetate, tert-butyl acetate, pentyl acetate, isopentyl acetate, hexyl acetate, cyclohexyl acetate, heptyl acetate, isononyl acetate, benzyl acetate, methyl chloroacetate, ethyl chloroacetate, methyl dichloroacetate, methyl trichloroacetate, methyl trimethylacetate, ethyl trimethylacetate, methyl propionate, ethyl propionate, propyl propionate, methyl 2-chloropropionate, butyl propionate, isopentyl propionate, hexyl propionate, cyclohexyl propionate, methyl butyrate, methyl isobutyrate, ethyl isobutyrate, ethyl butyrate, propyl butyrate, isopropyl butyrate, butyl butyrate, butyl isobutyrate, isobutyl isobutyrate, methyl 4-chlorobutyrate, pentyl butyrate, isopentyl butyrate, hexyl isobutyrate, methyl enanthate, methyl caproate, ethyl caproate, ethyl caprylate, methyl valerate, ethyl isovalerate, diethyl oxalate, diethyl succinate, dimethyl glutarate, dimethyl adipate, diethyl adipate, methyl salicylate, ethyl salicylate, dimethyl maleate, methyl benzoate, ethyl benzoate and esters of the general formula $R^{10}C(O)O(CH_2CH_2O)_n R^{11}$ wherein $R^{10}$ is methyl or ethyl, $R^{11}$ is selected from the group consisting of ethyl, n-propyl, isopropyl, n-butyl, isobutyl and t-butyl and n is 1 or 2.

22. A process as claimed in claim 1 wherein the water-loaded absorbing liquid which is heated in the regeneration step has a water loading of at least 10% by weight.

23. A process as claimed in claim 1 wherein the absorbing liquid-rich phase formed in the regeneration step contains less than 1% weight of water.

24. A process as claimed in claim 1 wherein the water-rich phase formed in the regeneration step contains less than 1% weight of absorbing liquid.

25. A process as claimed in claim 24 wherein the water-rich phase is contacted with a wash solvent which is immiscible with water such that at least part of the absorbing liquid present in the water-rich phase is extracted into the wash solvent to produce an extract phase and a purified water phase and the extract phase is then separated from the purified water phase.

26. A process as claimed in claim 25 wherein the wash solvent has a boiling point which is substantially lower than that of the absorbing liquid and the wash solvent is separated from the absorbing liquid contained in the extract phase as an overhead fraction by distillation.

27. A process as claimed in claims 26 wherein the wash solvent has a boiling point which is at least 20° C. below the boiling point of the absorbing liquid.

28. A process as claimed in claim 25 wherein the wash solvent is a light end hydrocarbon having from 5 to 10 carbons and mixtures thereof or an aromatic hydrocarbon such as toluene and xylene.

\* \* \* \* \*